United States Patent [19]
Kawai

[11] Patent Number: 5,818,616
[45] Date of Patent: Oct. 6, 1998

[54] OPTICAL COMMUNICATION APPARATUS AND CONFERENCE SYSTEM

[75] Inventor: Hisashi Kawai, Yokohama, Japan

[73] Assignee: Canon Kabushiki Kaisha, Tokyo, Japan

[21] Appl. No.: 661,418

[22] Filed: Jun. 7, 1996

Related U.S. Application Data

[63] Continuation of Ser. No. 287,861, Aug. 9, 1994.

[30] Foreign Application Priority Data

Aug. 23, 1993 [JP] Japan ................................. 5-207711

[51] Int. Cl.$^6$ .................................................. H04J 14/02
[52] U.S. Cl. .......................... 359/124; 359/164; 359/172; 348/15; 379/202
[58] Field of Search ................................... 359/124, 125, 359/115, 118, 175, 164, 167, 152, 172; 379/96, 292, 206; 370/62; 340/825.24, 825.25; 348/15

[56] References Cited

U.S. PATENT DOCUMENTS

| | | | |
|---|---|---|---|
| 3,513,443 | 5/1970 | Andersen | 359/167 |
| 4,054,794 | 10/1977 | Laughlin et al. | 359/124 |
| 4,400,724 | 8/1983 | Fields | 358/85 |
| 4,441,180 | 4/1984 | Schüssler | 359/125 |
| 4,456,793 | 6/1984 | Baker et al. | 359/172 |
| 4,481,621 | 11/1984 | Schmack et al. | 359/125 |
| 4,525,834 | 7/1985 | Schenkel et al. | 359/125 |
| 4,650,929 | 3/1987 | Boerger et al. | 358/86 |
| 4,654,483 | 3/1987 | Imai et al. | 379/54 |
| 4,686,667 | 8/1987 | Ohnsorge | 359/125 |
| 4,809,257 | 2/1989 | Gantenhein et al. | 359/172 |
| 4,827,085 | 5/1989 | Yaniv et al. | 379/96 |
| 4,975,926 | 12/1990 | Knapp | 359/172 |
| 5,283,638 | 2/1994 | Engberg et al. | 379/90 |
| 5,347,306 | 9/1994 | Nitta | 348/15 |
| 5,572,248 | 11/1996 | Allen et al. | 348/15 |

OTHER PUBLICATIONS

John Bond, Infrared radiation: a free spare transmission alternative, 1984, Telesis pp. 2–7.
PC Week/Hardware, Wireless LANS: Coming to your office, Jul. 24, 1989 vol. 8 No. 29 p. 20.
McManamon, Technical Implications of Teleconference Service, IEEE vol. COM 23 No. 1 Jan. 1975 pp. 30–38.
Hetfron, Teleconferencing comes of age, IEEE Spectrum Oct. 1984 pp. 61–66.

*Primary Examiner*—Rafael Bacares
*Attorney, Agent, or Firm*—Robin, Blecker & Daley

[57] ABSTRACT

In a conference system of the present invention, a terminal modulates a sound signal taken by a micro-phone which is connected to the terminal, a coordinate information signal which is designated using a digitizer, and a video signal. The terminal converts the modulated signals to an optical signal by frequency multiplexing, and send the optical signal to the central device of the system. After the central device receives the optical signal, the device separates and extracts a sound signal, a coordinate signal, and a video signal from the optical signal. Each of these separated signals is sent to a corresponding demodulating circuit to be demodulated, outputted as sound or an image afterwards. Further, the coordinate information signal is processed, for instance, as a command data from a conference attendant.

28 Claims, 14 Drawing Sheets

OPTICAL COMMUNICATION APPARATUS AND CONFERENCE SYSTEM

This is a continuation application under 37 CFR 1.62 of prior application Ser. No. 08/287,861, filed Aug. 9, 1994.

BACKGROUND OF THE INVENTION

This invention relates to an optical communication apparatus and application to a conference system, and more specifically to an optical communication apparatus which transmits and receives a frequency multiplexed optical signal carrying various information, and its application to a conference system.

In a television(TV) conference system, the central device of the TV conference system is connected to terminals operated by conference attendants with cables to exchange a plurality of information signals. In such TV conference system, a tablet (a coordinate input device) such as a digitizer, a microphone, and the like are connected to each of the terminals with wires, which spread all over a conference room. Those wires in a conference room are unattractive and unsightly, and besides the wirings need to be changed when the layout of chairs, desks, and so on, or settings of the conference room are rearranged. It is troublesome to change the wiring, and moreover, the layout of the settings may be limited because of the length of wires.

SUMMARY OF THE INVENTION

The present invention has been made in consideration of the above situation, and has as its object to provide an optical communication apparatus which supplies more freedom of the arrangement among a plurality of communication apparatuses by removing the connecting materials such as cables.

Another object of the invention is to provide an optical communication apparatus which communicates by using a frequency multiplexed optical signal carrying various information.

Still another object of the invention is to provide an optical communication apparatus which interchanges information by using a frequency multiplexed optical signal carrying various information including, at least, a sound signal.

Further, another object of the invention is to provide an optical communication apparatus which transmits a frequency multiplexed optical signal carrying various information including, at least, sound and image signals and which receives the optical signal and separates it into a plurality of signal components.

Further, another object of the invention is to supply a conference system which interchanges data among terminals used by conference attendants and a central device of a conference system by means of an optical signal.

Further, another object of the invention is to supply a conference system which interchanges data among terminals used by conference attendants and a central device of a conference system by means of a frequency multiplexed optical signal including sound, image, and other data signals.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings which are incorporated in and constitute a part of the specification, illustrate embodiments of the invention and, together with the description, serve to explain the principle of the invention.

DESCRIPTION OF THE PREFERRED EMBODIMENTS

Preferred embodiments of the present invention will be described in detail in accordance with the accompanying drawings.

Figure 1:
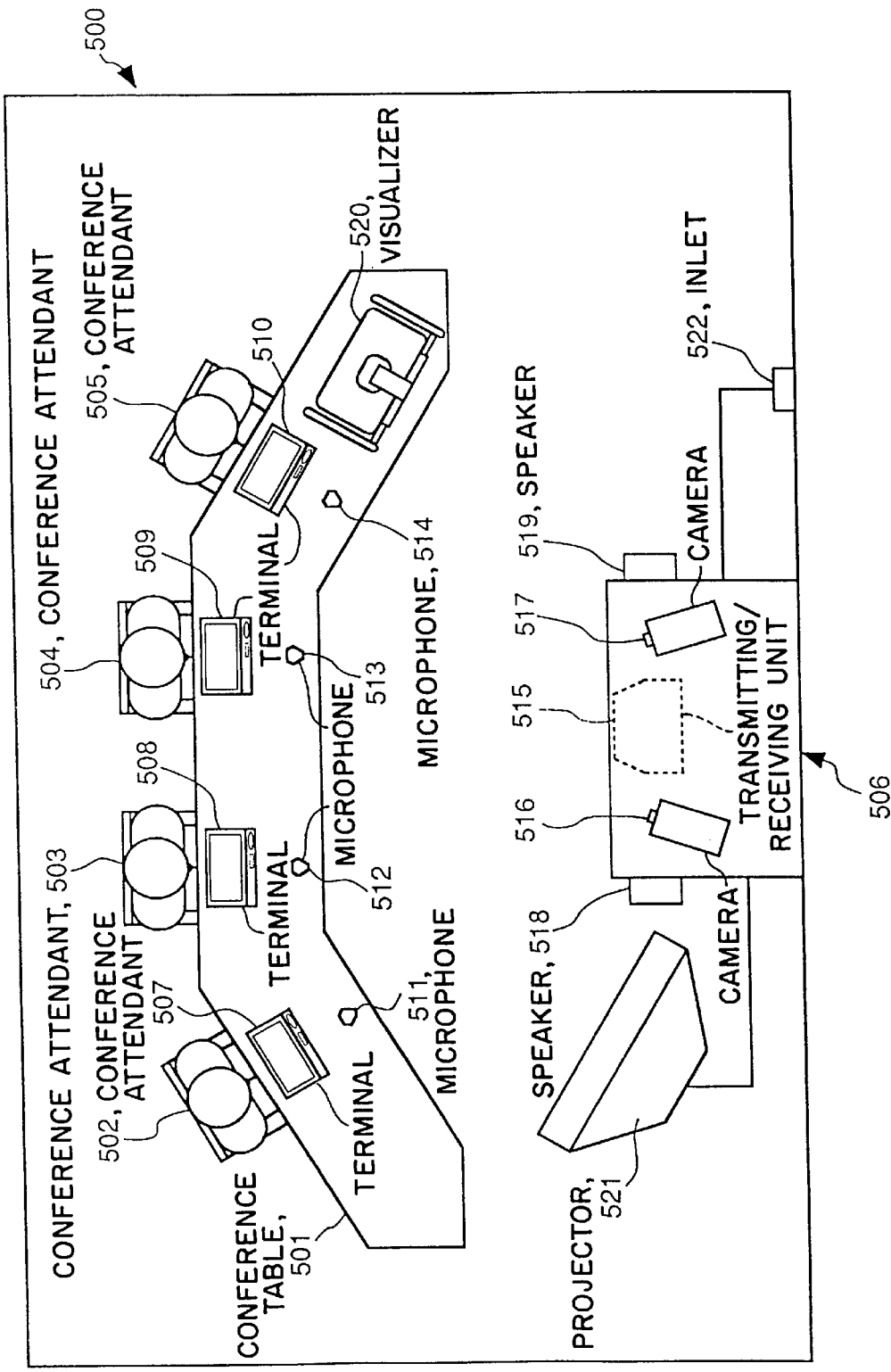
FIG. 1 is a diagram showing a structure of a TV conference system of an embodiment according to the present invention.

FIG. 1 shows an example of a TV conference system of an embodiment.

In FIG. 1, reference numeral 500 indicates an entire view of a conference room and 501 indicates a conference table. Reference numerals 502 through 505 indicate conference attendants, and 506 corresponds to a TV conference system central device. Reference numerals 507 through 510 are corresponding terminals and 511 through 514 are corresponding microphones to the conference attendants 502 to 505. An optical signal transmitting/receiving unit 515 is set so as to face the conference attendants in the TV conference system central device 506. Thus the unit 515 and each terminal can interchange optical signals. Cameras 516 and 517 take a view of the conference attendants, and reference numeral 518 and 519 denote speakers. Visualizer 520 converts the manuscript image, still-picture image, and the like to an electrical signal, and the electrical signal is converted to an optical signal and sent to the unit 515 to display an image on a projector 521. The projector 521 displays an image, and reference numeral 522 denotes an inlet to connect to an ISDN line, for instance.

With the aforementioned arrangement, assume that a conference attendant 502, for example, processes an agenda as a chairperson. In a conference, in general, conference materials and the like, of which image is taken by the visualizer 520, are displayed on the large screen of the projector 521, as well as sent to the TV conference system central device 506 at the same time. The displayed image may be also sent to an ISDN line through the inlet 522 as a still-picture image data which can be seen in a remote TV conference room (not shown). Accordingly, all the conference attendants in the both conference rooms can watch the same image simultaneously.

Thus the conference attendants can discuss with reference to the image on the projector 521, and ask questions about the image, and add, or make any corrections on the image. When an attendant asks questions, or makes any changes such as an addition, first, the image which is identical to the image on the projector 521 is called on the screen of the nearby terminal among the terminals 507 to 510, which will be explained later. Then the attendant inputs characters and figures on a digitizer equipped on the screen of the terminal using a pen or the like, and can indicate questions, or parts of the image to be added or corrected. Accordingly, the inputted contents on the digitizer are super-imposed on the image on the projector 521 in the both conference rooms and on the screens of the terminals, therefore all conference attendants can see the questions or added or corrected contents.

Figure 2:
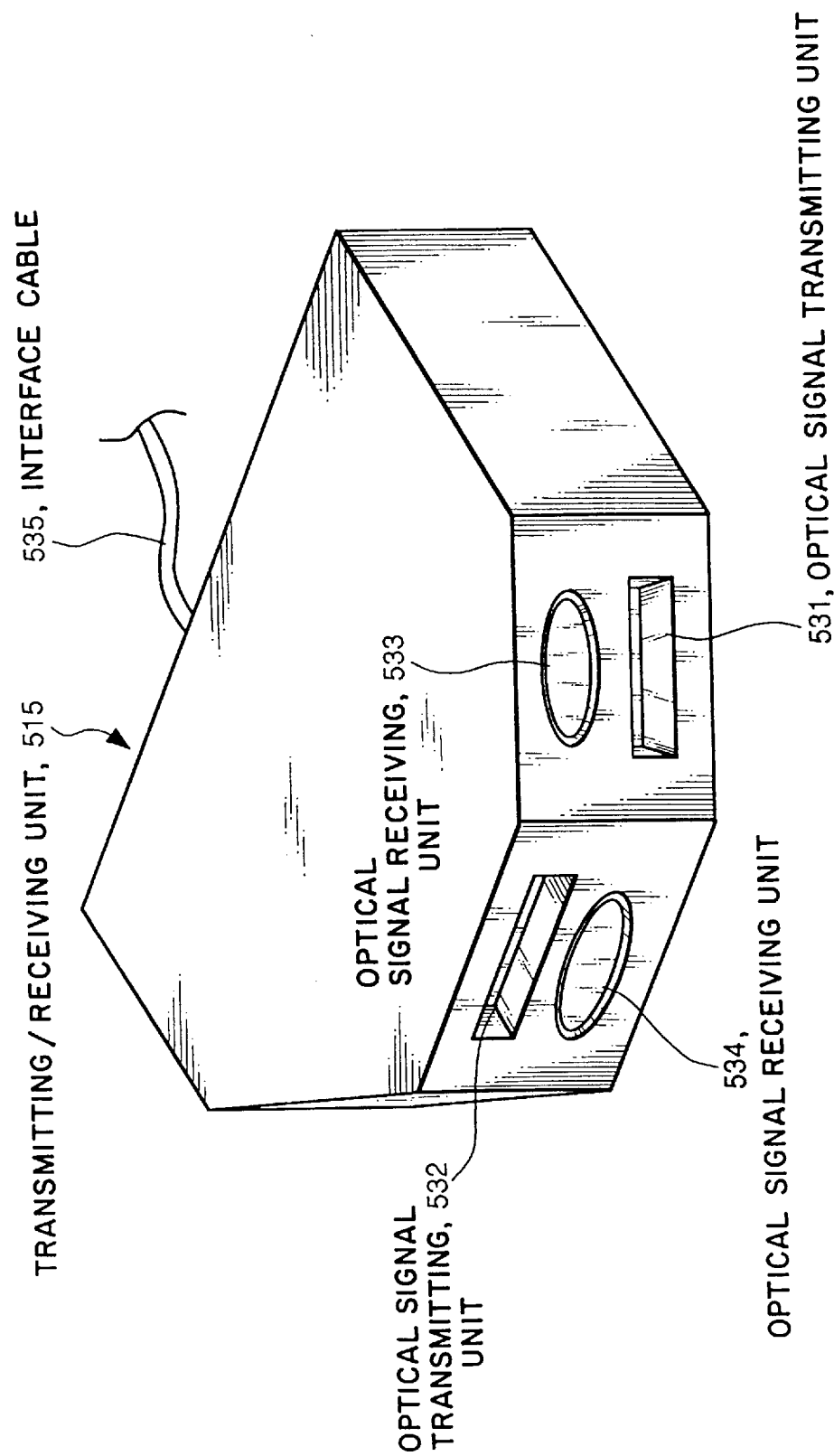
FIG. 2 illustrates an external appearance of an optical signal transmitting/receiving unit of the central device of the conference system in the embodiment.

FIG. 2 is a external appearance of the optical signal transmitting/receiving unit 515 of the TV conference system central device 506 according to the embodiment.

According to FIG. 2, optical signal transmitting units 531 and 532 transmit optical signals to the terminals of the conference attendants, and optical signal receiving units 533 and 534 receive optical signals from the terminals of the conference attendants. The signals are interchanged between the central device 506 and the optical signal transmitting/receiving unit 515 through an interface cable 535.

Figure 3:
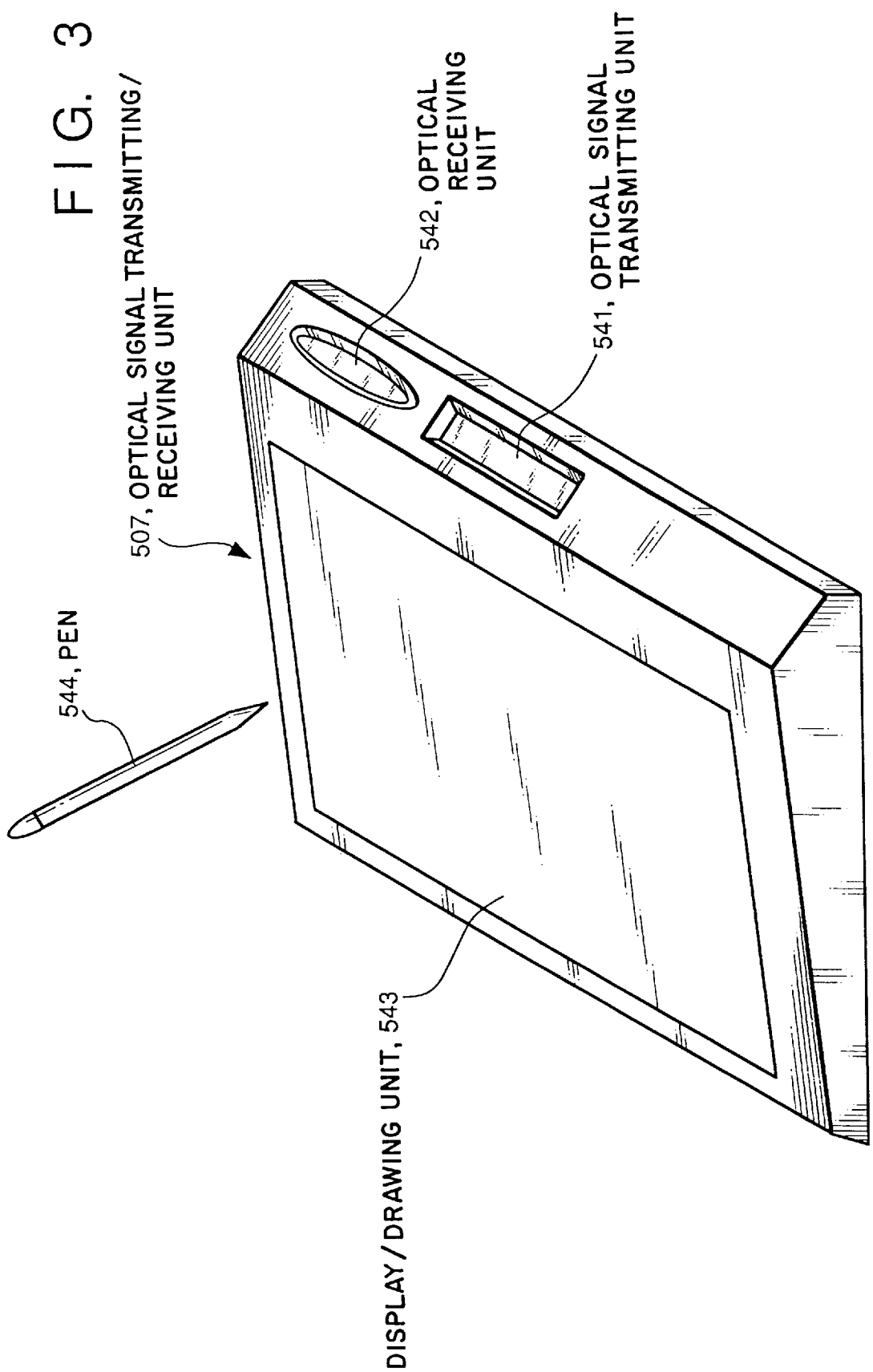
FIG. 3 illustrates an oblique external appearance of the terminal used by a conference attendant according to the embodiment.

FIG. 3 is the external appearance of the terminal 507, a sample of the terminals 507 to 510 of the conference attendants according to the embodiment. Each terminal 507 to 510 is identical to each other.

In FIG. 3, reference numeral 541 denotes an optical signal transmitting unit which transmits optical signals from the terminal 507 to the optical signal transmitting/receiving unit 515 of the central device 506, and 542 denotes an optical receiving unit which receives optical signals from the optical signal transmitting/receiving unit 515. Reference numeral 543 denotes a display/drawing unit having a liquid crystal screen 201 (FIG. 8) which displays an image transmitted from the optical signal transmitting/receiving unit 515 in the form of an optical signal, and a digitizer 101 (FIG. 8) for drawings by a conference attendant with a pen 544, which will be explained later.

Figure 4:
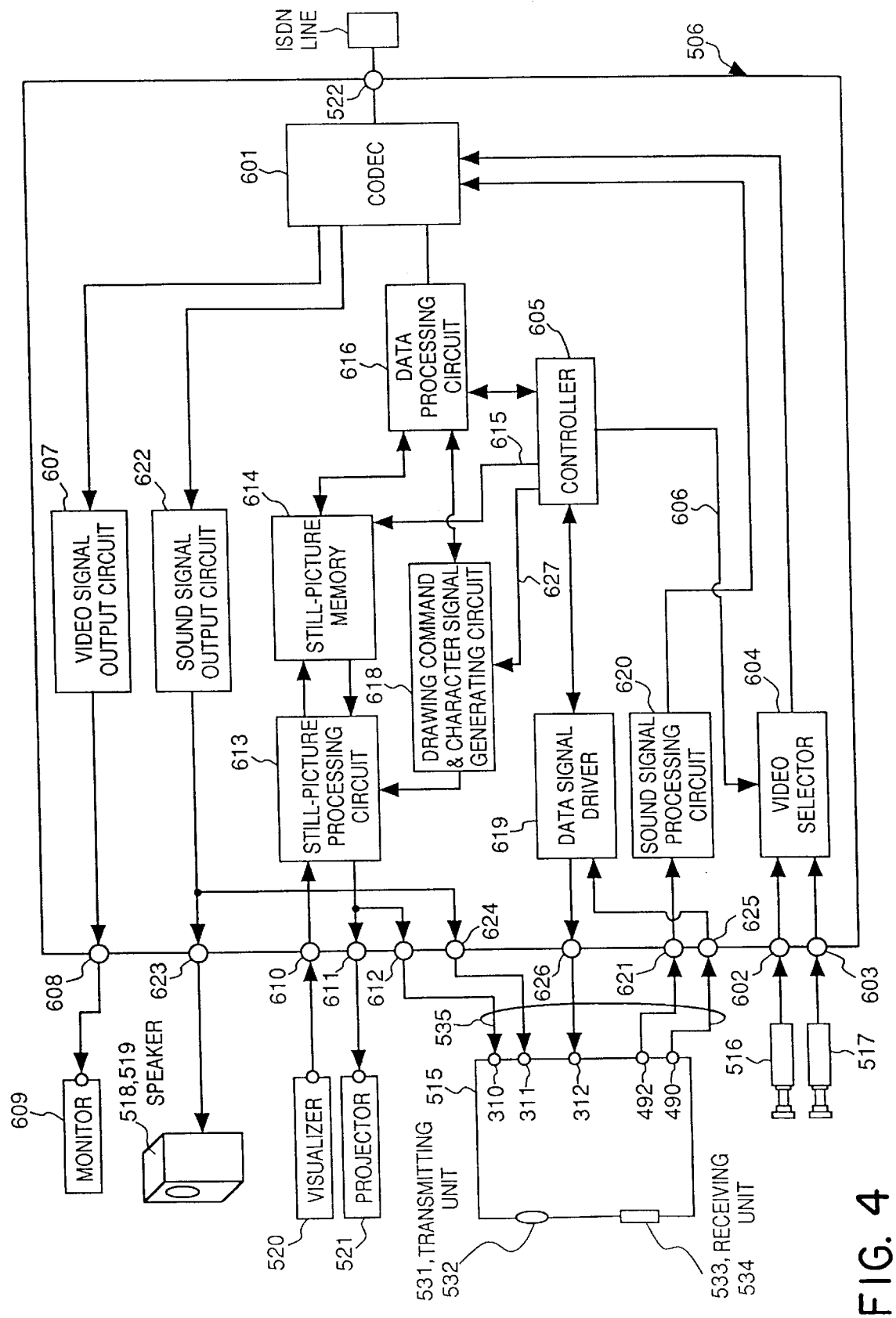
FIG. 4 is a block diagram showing a structure of the central device of the TV conference system according to the embodiment.

FIG. 4 is a block diagram showing a structure of the TV conference system central device 506 according to the embodiment. Elements in FIG. 4 which are denoted by the same numerals as in previous figures are identical, and the explanations of those numerals are omitted.

In FIG. 4, a codec 601 compresses and expands image signals, sound signals, and also data signals. The compressed signals are transmitted through the inlet 522, and outputted through the ISDN line. Further, the image, sound, and data signals which are sent from the other TV conference system through the inlet 522 are expanded by the codec 601, and sent to several circuit which will be explained later. Reference numerals 602 and 603 denote input terminals of video signals which are outputted from the cameras 516 and 517 respectively. A video selector 604 selects one of the video signals inputted from the input terminals 602 and 603 depending upon a selection signal 606 from a controller 605, and the selected video signal is sent to the codec 601. 607 is a video signal output circuit, and it outputs a video signal based on a signal from the codec 601 to an output terminal 608. Reference numeral 609 indicates a builtin monitor in the TV conference system central device 506, and it displays an image based on the video signal from the video signal output circuit 607.

Further, reference numeral 610 indicates an input terminal to which image signals are inputted from the visualizer 520, and 611 and 612 indicate output terminals to output image signals from a still-picture processing circuit 613, to the projector 521 and the optical transmitting/receiving unit 515 of the central device 506. The still-picture processing circuit 613 processes the image signal from an input terminal 610, and outputs image data to a still-picture memory 614 which stores the image data. In addition, the circuit 613 reads still-picture data stored in the still-picture memory 614 depending upon a control signal from the controller 605, and outputs the still-picture data to output terminals 611 and 612. Regarding the still-picture memory 614, the image data inputted from the still-picture processing circuit 613 and the still-picture data sent from the other TV conference system through a data processing circuit 616 are temporarily stored in the still-picture memory 614 in dependence upon the control signal from the controller 605. In addition, the still-picture memory 614 outputs the stored still-picture data to the still-picture processing circuit 613 and to the data processing circuit 616. The data processing circuit 616 outputs the image data stored in the still-picture memory 614, the data from a drawing, command, and character signal generating circuit 618, or the data from the controller 605 in accordance with a control signal 617 from the controller 605, to the codec 601. Further, the data processing circuit 616 do the jobs such as outputting the still-picture data from the codec 601 to the still-picture memory 614 and storing it, and outputting a drawing, command, or character signal to the drawing, command, and character signal generating circuit 618, and also outputting data from the codec 601 to the controller 605.

Reference numeral 621 in FIG. 4 denotes an input terminal to which a sound signal is inputted from the optical transmitting/receiving unit 515. A sound signal processing circuit 620 processes and outputs a sound signal inputted from the input terminal 621 to the codec 601. A sound signal output circuit 622 outputs a sound signal which is sent from the other TV conference system through the ISDN line and expanded by the codec 601, to output terminals 623 and 624. The output terminal 623 outputs the sound signal to the speakers 518 and 519, and the output terminal 624 outputs the sound signal from the sound signal output circuit 622 to the optical signal transmitting/receiving unit 515. An input terminal 625 inputs a data signal from the optical transmitting/receiving circuit 515. When the data signal is inputted from the input terminal 625, a data signal driver 619 outputs the data signal to the controller 605, and outputs a data signal from the controller 605 to an output terminal 626. The drawing, command, and character signal generating circuit 618 generates a data signal to add drawing data and character signal to image signals from the still-picture processing circuit 613 according to a control signal 627 from the controller 605.

Next, an application of the system for a conference is discussed with reference to the aforementioned structure as an example.

Assume a video signal inputted from the input terminal 602 taken by the camera 516 is sent to the codec 601 after being selected by the video selector 604 in accordance with the selection signal 606 from the controller 605. The codec 601 compresses the video signal. In the same manner, a sound signal inputted from the optical transmitting/receiving unit 515 is inputted through the input terminal 621. Then, the sound signal is processed by the sound signal processing circuit 620, sent to the codec 601 and compressed. The compressed video and sound signals are sent to other TV conference system (the other side of the line) through the inlet 522 and the ISDN line.

Further, a video signal and a sound signal, sent from other TV conference system, are expanded by the codec 601. The expanded video signal is transmitted to the video signal output circuit 607, and through the output terminal 608, displayed on the monitor 609 of the TV conference system. The expanded sound signal is outputted to the sound signal output circuit 622, and outputted by the speakers 518 and 519 through the output terminal 623. The expanded sound signal is also sent to the optical signal transmitting/receiving unit 515 through the output terminal 624. The optical signal transmitting/receiving unit 515 modulates the frequency of the sound signal, changes the frequency modulated sound signal into an optical signal, and transmits the optical signal to the terminals of conference attendants 507 to 510. Accordingly, the conference attendants can listen to the sound signal with head-phones (202 in FIG. 8) which are connected to the respective terminals.

Next, assume that a conference attendant 504 shows a conference material as a still-picture, and the visualizer 520 takes an image of it, then other conference attendants issue a command to receive the image signal from the visualizer 520 with the respective terminals. When the command is issued, a command signal is outputted from the optical signal transmitting unit 541 of a terminal of corresponding conference attendant in a form of an optical signal, and received by the signal receiving unit 533 and 534 of the central device 506. The command signal is inputted through the input terminal 625, after that inputted to the controller 605 through the data signal driver 619. In a case where the controller 605 receives the command signal, it issues a command to store the image signal from the visualizer 520 in the still-picture memory 614. The still-picture memory 614 thus stores the image signal of the conference material temporarily.

Further, when the conference attendant 504 inputs a command through the same route to the controller 605 to display the still-picture image of the conference material, the controller 605 issues a command to the still-picture memory 614 to output the stored image data. The still-picture memory 614 outputs the still-picture image data of the conference material to the still-picture processing circuit 613 and the data processing circuit 616. The still-picture processing circuit 613 super-imposes image data from the drawing command, and character signal generating circuit 618 onto the still-picture signal from the still-picture memory 614. The super-imposed image data is sent through the optical signal transmitting/receiving unit 515 and displayed on the respective terminals of the conference attendants.

Further, the data processing circuit 616 outputs a combined image signal of the still-picture image from the still-picture memory 614 and image data from the drawing, command, and character signal generating circuit 618 to the codec 601. The codec 601 generates a multiplexed signal which is multiplexed with the image signal from the data processing circuit 616, the video signal and the sound signal, and outputs the multiplexed signal to the ISDN line. In other TV conference system, the multiplexed signal is separated into a still-picture image signal and drawing signal, command signal, and character signal. The central device in other TV conference system can display the still-picture on the visualizer in the TV conference system. As a result, the identical image on the transmitted side projector 521 is displayed by the projector of the TV conference system of the receiving side, and the identical sound is outputted at the receiving side. If a conference attendant 505 wants a part of the image enlarged, the enlargement is accomplished by indicating the part to enlarge, e.g., by circling the part in the still-picture displayed on the terminal 510 by the pen 544. In this case, position information indicated by the pen 544 is transmitted from the terminal 510 and received by the optical signal transmitting/receiving unit 515 of the central device 506. In the same manner as explained above, the command (for enlargement) and the drawing data (for showing a circle) are sent to the controller 605, then the controller 605 outputs the command and drawing data to the drawing, command, and character, signal generating circuit 618. The drawing, command, and character signal generating circuit 618 outputs the identical drawing data drawn by the conference attendant 505 to the still-picture processing circuit 613, and the drawing data is outputted to display in addition to the previous image on the projector 521. In this way, the conference attendant 505 can enlarge the desired portion of the image of the conference materials, and the displayed still-picture is temporarily stored and displayed based on the designation of the conference attendant 505.

[Explanation of a multiplexed signal]

Figure 5:
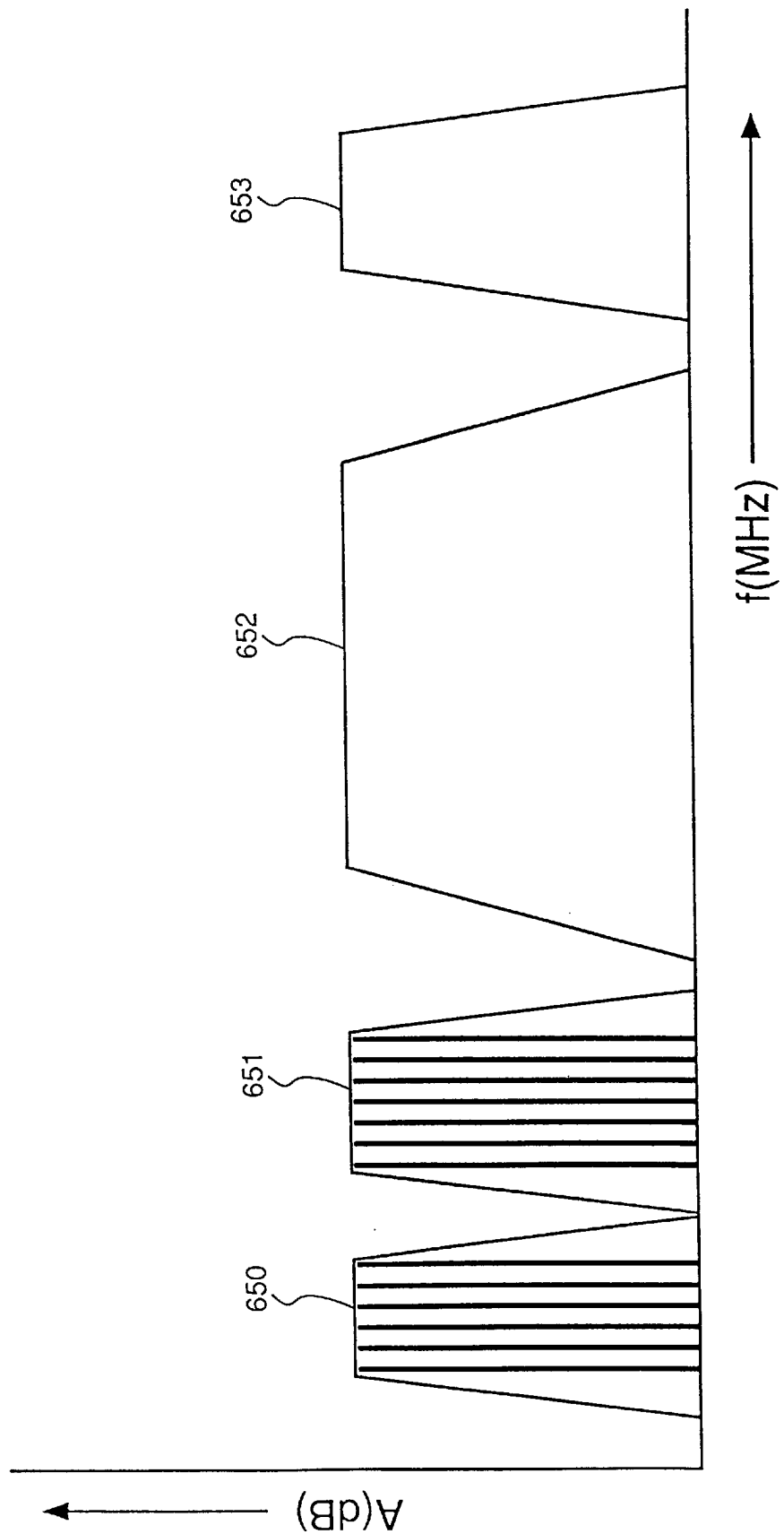
FIG. 5 is a diagram explaining frequency bands of optical signals used in the TV conference system according to the embodiment.
Figure 6:
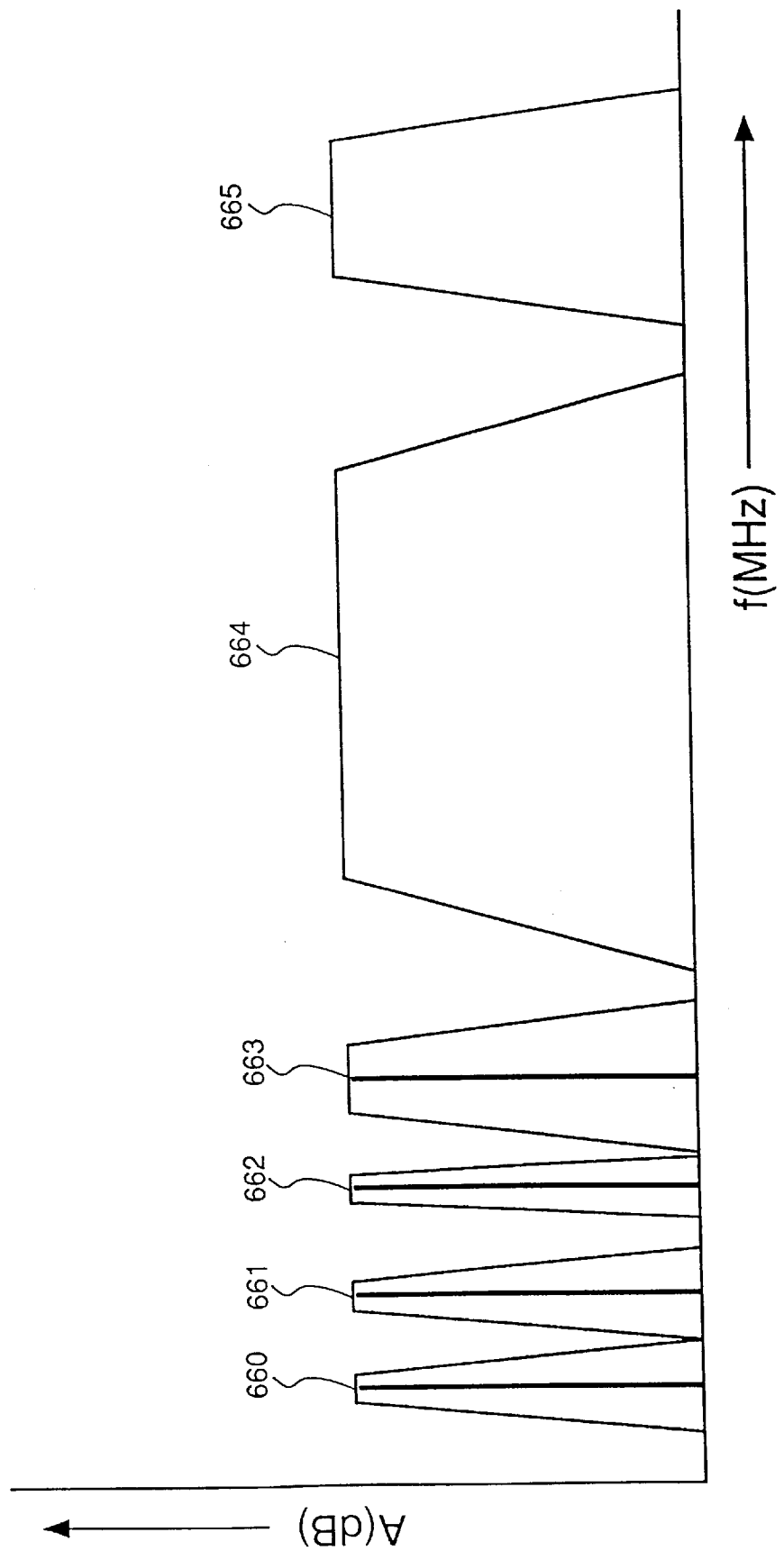
FIG. 6 is a diagram showing another example of frequency bands of optical signals used in the TV conference system according to the embodiment.

FIG. 5 and FIG. 6 illustrate diagrams explaining frequency bands of optical signals used in the TV conference system of the embodiment.

In this embodiment, a lower frequency band of an optical signal is reserved for transmission and reception of a sound signal, and the lowest frequency range of the lower frequency band is reserved for transmitting the sound signal from the central device 506 to the respective terminals. Likewise, a middle frequency band is reserved for transmission and reception of the data signal, and the lowest frequency range of the middle frequency band is assigned for transmitting the data signal from the central device 506 to the respective terminals as in the case of the sound signal. Each terminal is able to discriminate the signal whether it is for all the terminals or for the specified terminal according to a flag (destination signal in FIG. 7) which is contained in the data signal. Depending upon the discrimination, each terminal performs a signal receiving job.

FIG. 5 illustrates the case that each terminal transmits and receives the sound and command signals using the different frequency bands. Reference numerals 650 and 651 indicate the modulated frequency bands for the sound signal and for the command signal, respectively. In addition, 652 and 653 denote modulated frequency bands for the video signal and for the extension data, respectively.

Further, FIG. 6 shows frequency bands for other modulated signals, for instance, reference numeral 660 indicates a modulated frequency band of the sound signal transmitted from the central device 506 to the respective terminals, and 661 is a modulated frequency band for the sound signal transmitted from the respective terminals to the central device 506. Similarly, 662 indicates a modulated frequency band for the command signal transmitted from the central device 506 to the respective terminals. In this case, after the central device 506 receives a signal in a time sharing manner, the device 506 performs a signal receiving job by detecting from which terminal the signal came. Further, reference numerals 664 and 665 denote modulated frequency bands for a video signal and an expanded data, respectively. It should be noted that either method explained with reference to FIG. 5 and FIG. 6 can be used in this embodiment.

Figure 7:
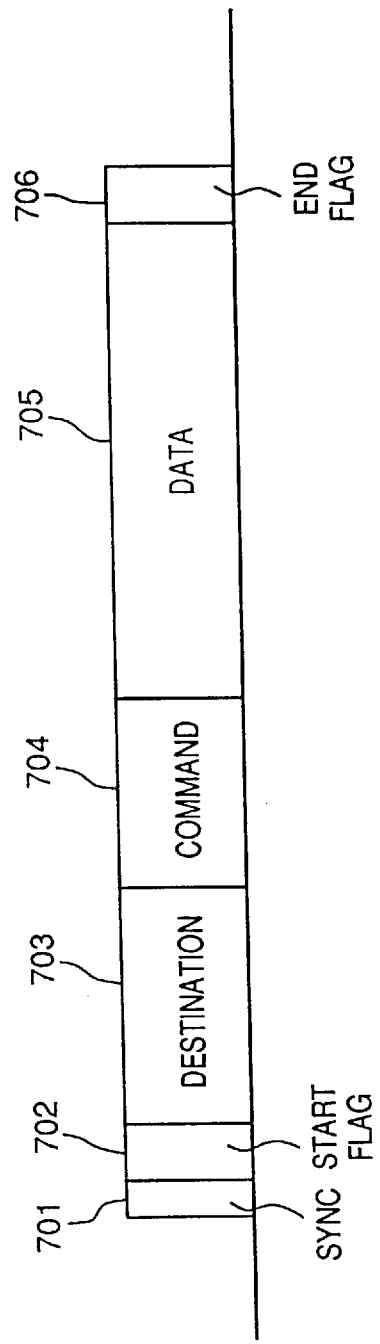
FIG. 7 is a diagram showing an example of data formats of a data signal.

FIG. 7 is a diagram showing a data format of the data signal;

In FIG. 7, reference numeral 701 indicates a synchronizing signal, and 702 denotes a start flag to indicate the beginning of message. 703 is a destination signal to designate the receiving side of the data signal, 704 is a command to indicate the type of the command data, and 705 is data (message). 706 is an end flag to indicate the end of the data signal.

[Example 1 of the transmitting and receiving process between the terminals and the central device 506]

In a case explained with reference to FIG. 5, since transmitted signals (sound signals, command signals) from the terminals of conference attendants to the central device 506 differ from each other in modulated frequency band, the central device 506 receives and demodulates signals from the respective terminals, and detects the terminal which sent the signal in accordance with the frequency and processes the signal from the terminal.

[Example 2 of the transmitting and receiving process between the terminals and the central device 506]

In a case where FIG. 6 illustrates, the central device 605 outputs a designation signal (a request signal) of the conference attendant to the terminals one after another, and each terminal corresponds to the central device 506 in a predetermined time period whether or not there is data to send. If there is, the terminal sends the data to the central device 506.

In any cases explained above, the central device 506 processes the signal sent from each terminal in accordance with the terminal. If the received data from the terminal is a drawing data inputted with the pen 544, the central device 506 adds the drawing data onto the still-picture image displayed on the projector 521. If the received signal is to instruct the direction of the cameras 516 and 517, for zooming operation, and so on, the central device 506 outputs a control signal to the cameras 516 and 517, for a pan head, and the like, to a camera/pan head controller which is not shown in figures, based on the received signal.

[Explanation of a terminal]

Figure 8:
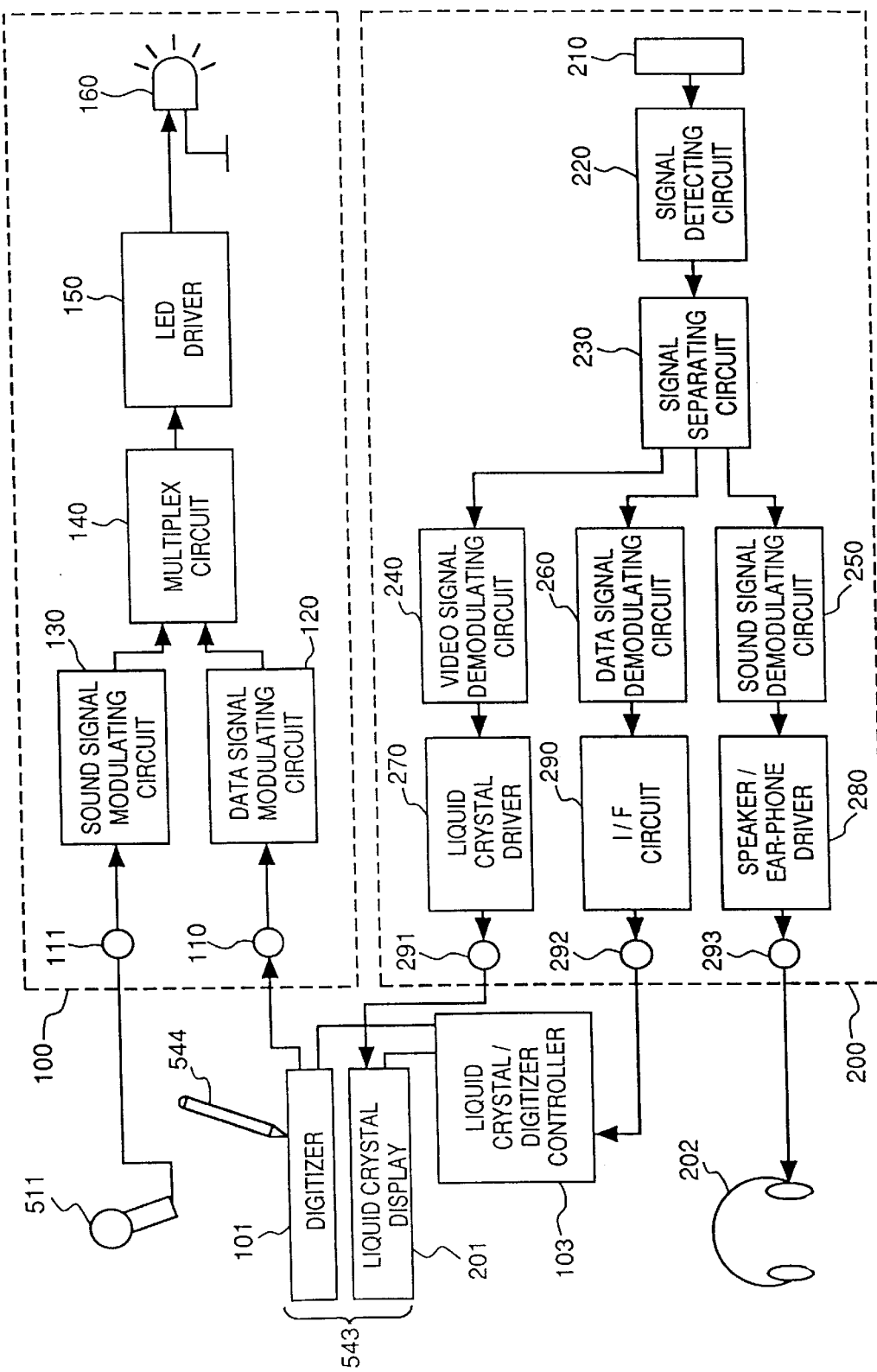
FIG. 8 is a block diagram showing a structure of the terminal used by a conference attendant according to the embodiment.

FIG. 8 is a block diagram showing a structure of a terminal of a conference attendant in the TV conference system according to the embodiment.

In FIG. 8, reference numeral 100 denotes a transmitting unit to transmit an optical signal to the central device 506, and reference numeral 200 denotes a receiving unit to receive an optical signal from the central device 506. A display and drawing unit 543 comprises a digitizer 101 and a liquid crystal display unit 201. Reference numeral 511 denotes a microphone, and 103 denotes a liquid/digitizer controller to control the digitizer 101 and the liquid crystal display unit 201. An input terminal 110 inputs data indicating a digitizer display mode from the digitizer 101 and a position information. A sound signal taken by the microphone 511 is inputted from a sound input terminal 111. A digitizer (coordinate) information inputted from the input terminal 110 is modulated by a data signal modulating circuit 120, and a sound signal which is sound information of a conference attendant is modulated by a sound signal modulating circuit 130. Reference numeral 140 denotes a signal multiplex circuit, and it multiplexes frequencies of the signals from the data signal modulating circuit 120 and the signal from the sound signal modulating circuit 130 by a predetermined rate The structure of the signal multiplex circuit 140 will be explained later with reference to FIG. 9. A LED driver 150 amplifies the signal from the signal multiplex circuit 140, and operates a LED 160 according to the amplified signal. The light emitted from the LED 160 is sent to the central device 506 through the optical signal transmitting unit 541 of the terminal.

Next, the structure of the receiving unit 200 of the terminal will be explained.

In FIG. 8, the liquid crystal display unit 201 displays an image based on an image signal outputted from the liquid crystal/digitizer controller 103. A head-phone 202 plays the sound outputted from a sound output terminal 290. A photo-diode 210 is placed inside of the optical signal receiving unit 542 of the terminal, and receives the optical signal from the optical signal transmitting/receiving unit 515 which is connected to the central device 506. A signal detecting circuit 220 detects and amplifies the signal from the photo-diode 210. A signal separating circuit 230 separates the signal, from the signal detecting circuit 220, which is multiplexed from a image signal, a sound signal, and a data signal according to each signal's frequency. The structure of the signal separating circuit 230 will be explained later with reference to FIG. 10.

In FIG. 8, an image signal demodulating circuit 240 demodulates the modulated image signal from the signal separating circuit 230. A sound signal demodulating circuit 250 demodulates the modulated sound signal outputted from the signal separating circuit 230. A data signal demodulating circuit 260 demodulates the demodulated data signal outputted from the signal separating circuit 230. A liquid crystal driver 270 outputs the image signal, which is demodulated by the image signal demodulating circuit 240, to the liquid crystal display unit 201, and a speaker/ear-phone driver 280 drives the head phone 202 and the like depending upon the demodulated sound signal which is outputted from the sound demodulating circuit 250. An interface circuit 290 changes the data signal from the data demodulating circuit 260 to a signal of which the format fits an output format of the liquid crystal display unit 201. Reference numeral 293 denotes a sound signal output terminal to output the sound signal from a speaker/ear-phone driver 280, 291 denotes an image signal output terminal to output the image signal from the liquid crystal driver 270, and 292 denotes a data signal output terminal to output the data signal from the interface circuit 290 to the liquid crystal/digitizer controller 103.

Figure 9:
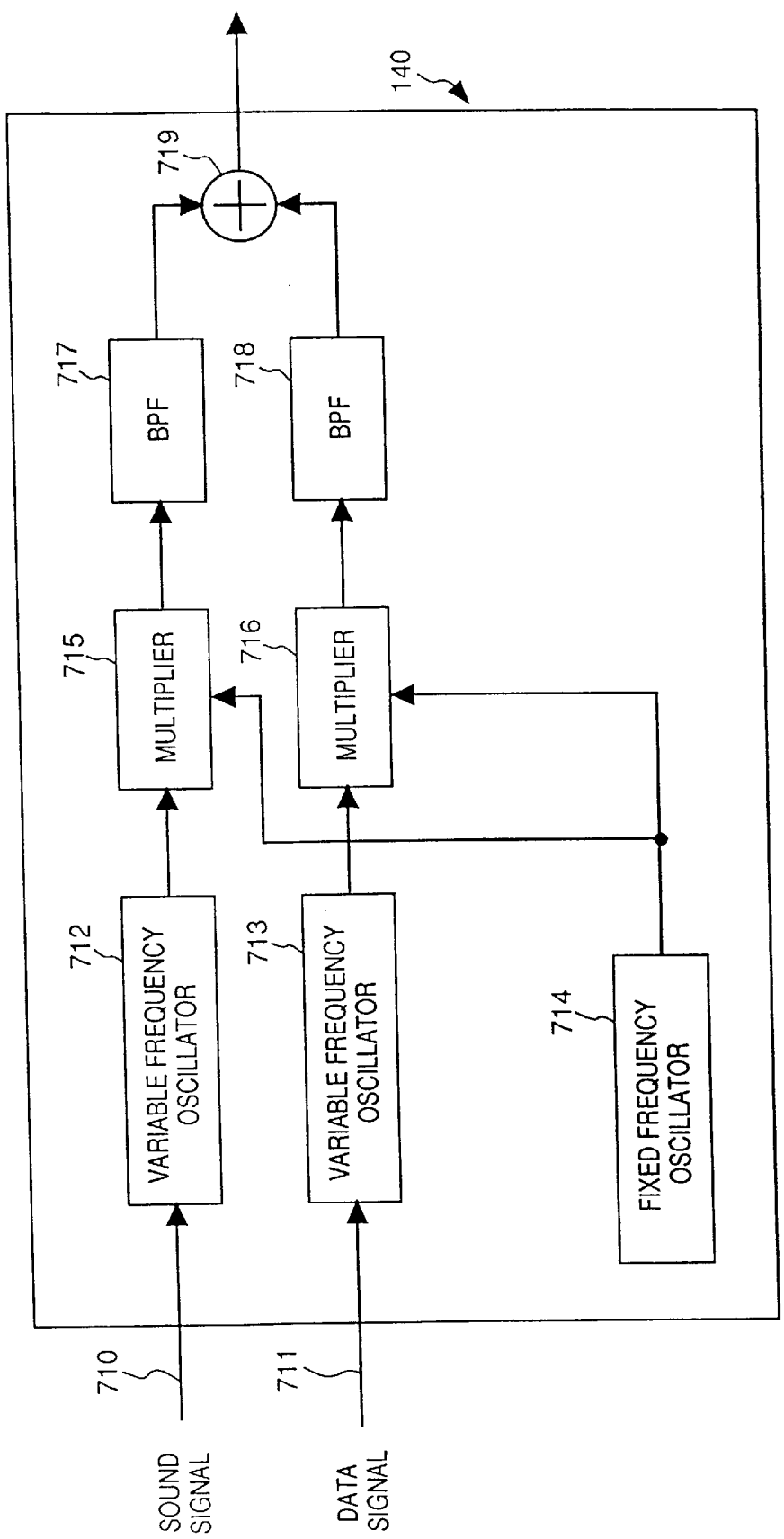
FIG. 9 is a block diagram showing a structure of a signal multiplex circuit of the terminal according to the embodiment.

FIG. 9 is a block diagram showing a structure of the signal multiplex circuit 140 of the embodiment.

A sound signal 710 taken from the microphone 511 and a data signal 711 inputted by the digitizer 101 are modulated by variable frequency oscillators 712 and 713, respectively, in the frequency shift range mainly around a predetermined frequency. In other words, the frequency of the output signal from each oscillator is shifted after multiplied by a clock signal of a fixed frequency (9.1 MHz, for instance), which is outputted from an oscillator 714, at multipliers 715 and 716. Out of frequency-shifted signals, only the needed frequency range is chosen by band-pass filter (BPF) 717 and 718. The filtered signals are added by an adder 719, and outputted to the LED driver 150.

Figure 10:
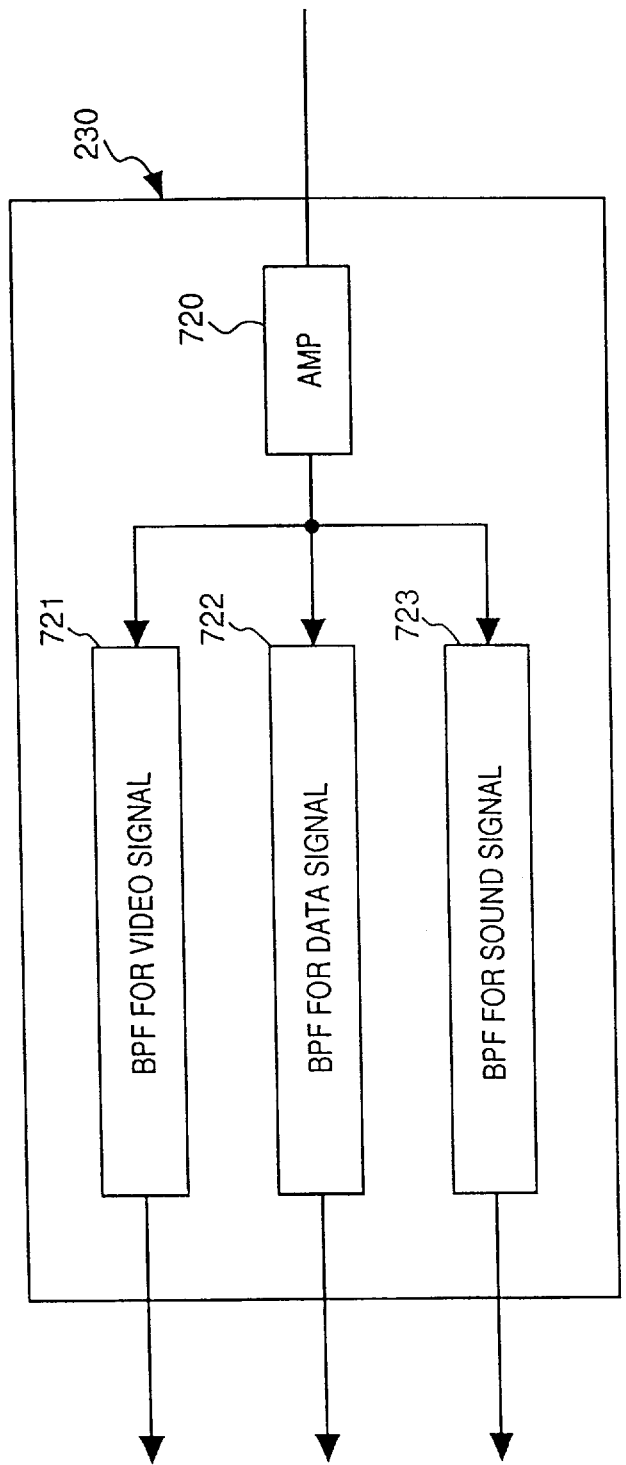
FIG. 10 is a block diagram showing a structure of a signal separating circuit of the terminal according to the embodiment.

Next, the signal separating circuit 230 of a terminal of a conference attendant is explained with reference to FIG. 10.

An optical signal sent from the optical signal transmitting and receiving unit 515 of the central device 506 is received by the photo-diode 210 and further detected by the signal detecting circuit 220, and inputted to the signal separating circuit 230. In FIG. 10, after the received optical signal is amplified by an amplifier 720, band-pass filters 721 to 723 which correspond to the frequencies of the video signal, the data signal, and the sound signal, respectively, take the signals of the corresponding frequencies. Accordingly, the respective signals which are separated into the video signal, the data signal, and the sound signal are demodulated by the demodulating circuits (240, 250, 260) corresponding to the signals.

Thus, all frequency bands of the optical signals sent from the optical signal transmitting/receiving circuit 515 of the central device 506 are fixed, therefore, the signals are filtered through the band-pass filters 721 to 723 which correspond to the video signal, the data signal, and the sound signal frequency band, respectively. After this, the signals are outputted to the demodulating circuits, 240, 250, and 260.

Figure 11A:
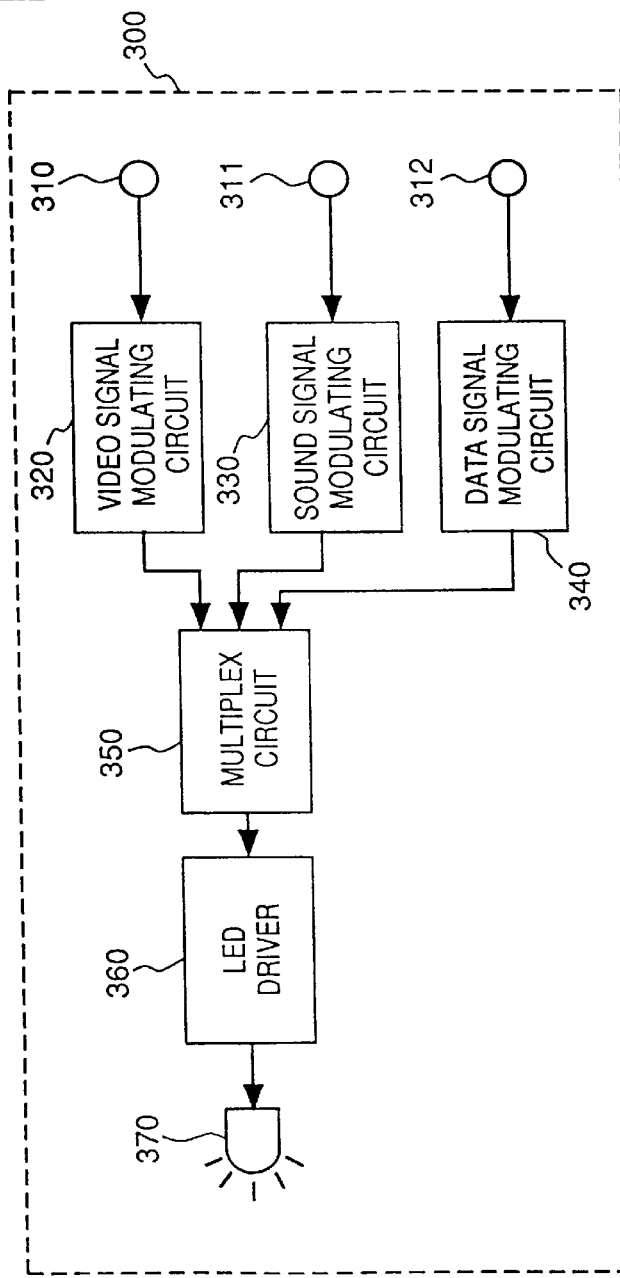
FIG. 11A is a block diagram showing a structure of an optical signal transmitting unit of the central device according to the embodiment.
Figure 11B:
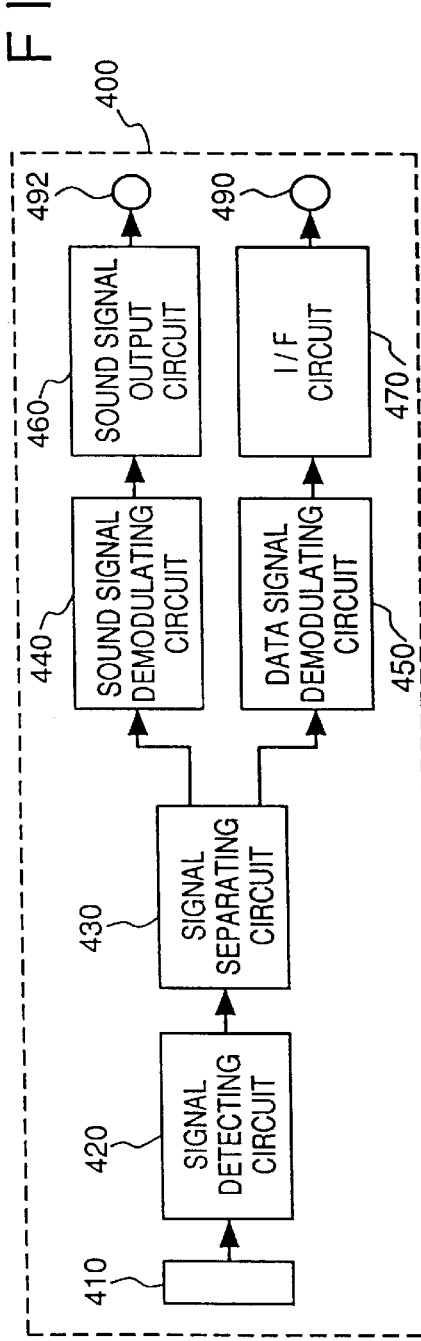
FIG. 11B is a block diagram showing a structure of an optical signal receiving unit of the central device according to the embodiment.

FIG. 11A and FIG. 11B are block diagrams illustrating the structure of the optical signal transmitting/receiving unit 515 of the TV conference system central device 506. More specifically, FIG. 11A shows the structure of the transmitting unit 300, and FIG. 11B shows the structure of the receiving unit 400.

In FIG. 11A, reference numeral 300 denotes a transmitting unit, 310 denotes a video signal input terminal for inputting a video signal which is outputted from the TV conference system central device 506 and which is displayed on the liquid crystal display unit 201 of a terminal. A sound signal input terminal 311 inputs a sound signal sent from the central device 506 to the head-phone 202, a data signal input terminal 312 inputs a data signal sent from the central device 506 to the liquid crystal/digitizer controller 103. A video signal modulating circuit 320 modulates the video signal to be displayed on the liquid crystal display unit 201, a sound signal modulating circuit 330 modulates the sound signal inputted from the input terminal 311, and a data signal modulating circuit 340 modulates the data signal inputted from the data signal input terminal 312. Reference numeral 350 denotes a signal multiplex circuit, and it multiplexes frequencies of the output signals from the video signal modulating circuit 320, from the sound signal modulating circuit 330, and from the data signal modulating circuit 340 in a predetermined rate. A LED driver 360 drives a LED 370 in accordance with the output signal from the signal multiplex circuit 350, and output an optical signal. The structure of the signal multiplex circuit 350 will be explained later with reference to FIG. 12.

Figure 12:
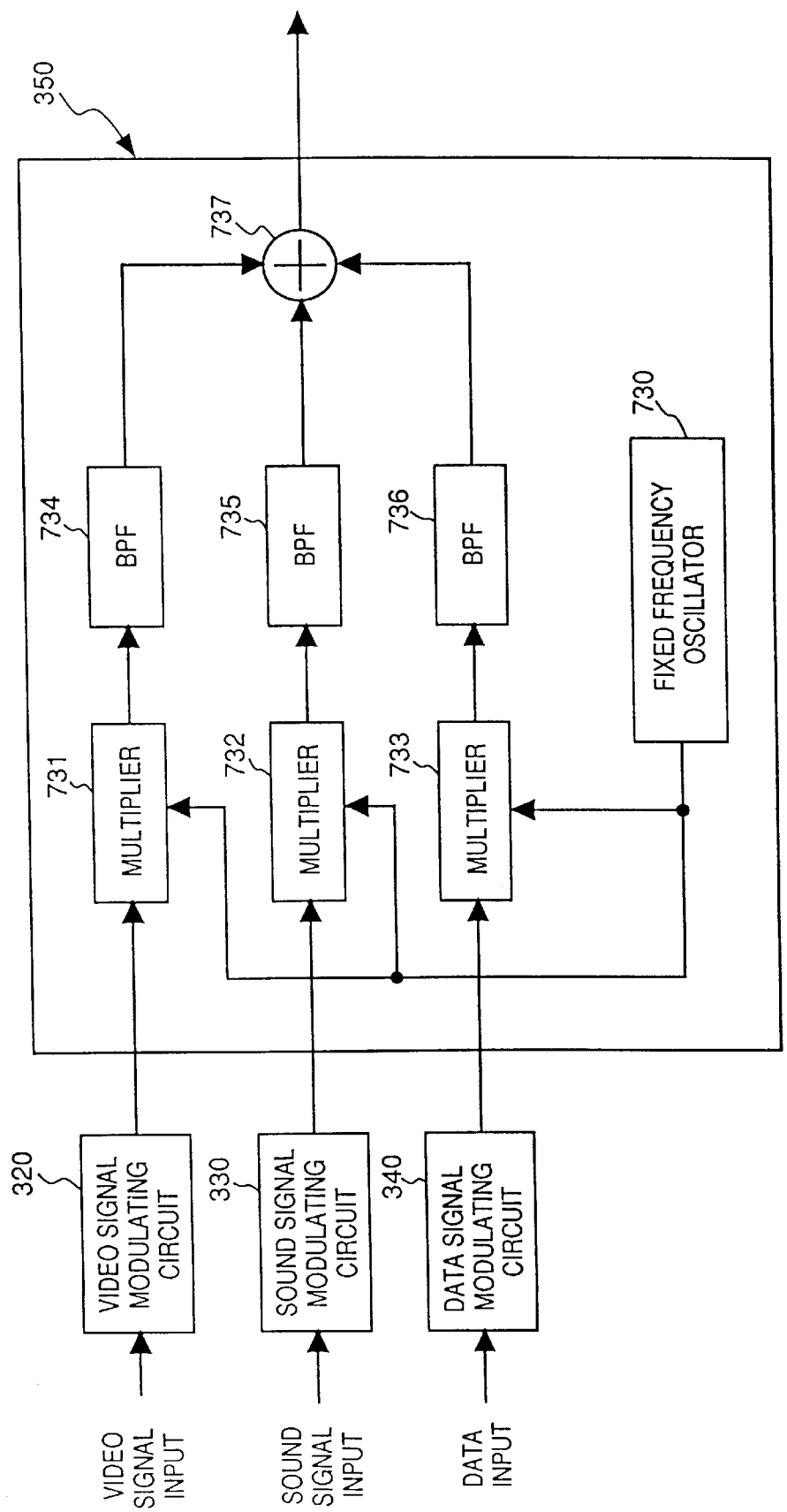
FIG. 12 is a block diagram showing a structure of a signal multiplex circuit of the optical signal transmitting unit of the central device according to the embodiment.

In FIG. 12, 730 is an oscillator to output a signal of a fixed frequency, and 731 to 733 denote multipliers which shift the frequency according to the modulated video signal, sound signal, and data signal, respectively, multiplied by a predetermined frequency. Then, after each frequency-shifted signal passes a corresponding frequency band-pass filter denoted by 734 to 736, inputted to an adder 737, then outputted as a multiplexed signal.

FIG. 11B is a block diagram illustrating the outlined structure of the receiving unit 400 of the optical signal transmitting/receiving unit 515 in the central device 506.

In FIG. 11B, a photo-diode 410 receives an optical signal sent from the transmitting unit 100 of a terminal of a conference attendant, and when any optical signal is detected, the photo-diode 410 output an electrical signal to a signal detecting circuit 420. The signal detecting circuit 420 detects the electrical signal received from the photo-diode 410, and outputs the detected signal to a signal separating circuit 430. The signal separating circuit 430 extracts the data signal and the sound signal out of the frequency-multiplexed signal by frequency division. A sound signal demodulating circuit 440 outputs the sound signal after demodulating the modulated sound signal from the signal separating circuit 430. A data signal demodulating circuit 450 outputs the data signal after demodulating the modulated data signal from the signal separating circuit 430. A sound signal output circuit 460 outputs the demodulated sound signal from the sound signal demodulating circuit 440 to the central device 506 through the output terminal 492. The sound signal is outputted from the speakers 518 and 519 after processed in the central device 506, or sent to the other conference system by the codec 601 through the ISDN line. An interface circuit 470 outputs the data signal which is demodulated by the data signal demodulating circuit 450 to the central device 506 through the output terminal 490.

Figure 13:
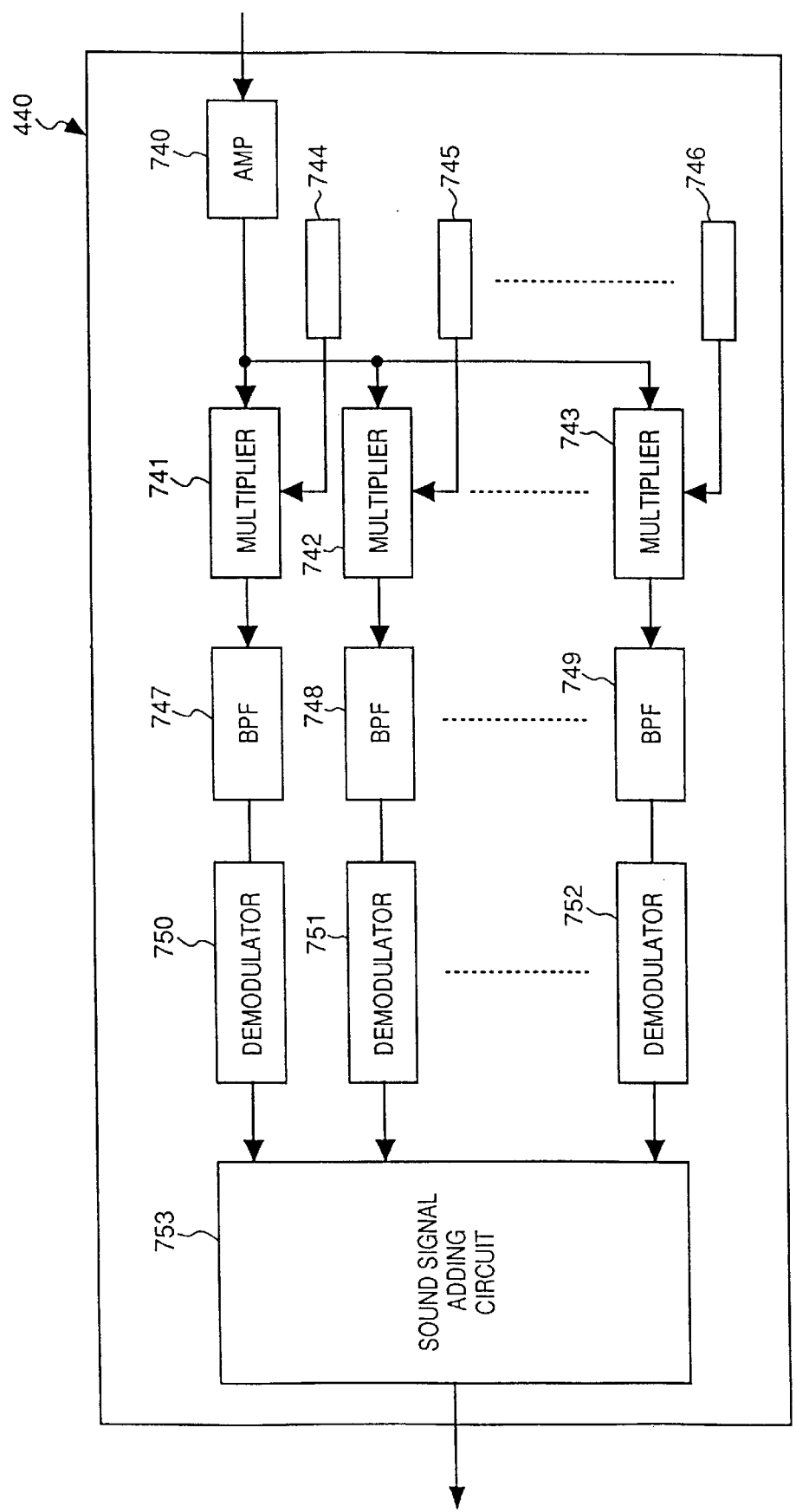
FIG. 13 is a block diagram showing a structure of a sound signal demodulating circuit of the optical signal receiving unit of the central device according to the embodiment.

FIG. 13 is a block diagram showing a structure of the sound signal demodulating circuit 440 of the embodiment.

The sound signal obtained by the signal separating circuit 430 is amplified by an amplifier 740. After that, the amplified sound signal is inputted to multipliers 741 to 743, and multiplied (frequency-shifted) by signals of the different frequencies from oscillators 744 to 746, respectively. The frequencies of the signals for the multiplication corresponds to the fixed frequency (e.g. 9 in FIG. 9, 1 MHz) multiplied at the respective terminals of conference attendants, and all band-pass filters 747 to 749 which are connected after the multipliers pass the signals in the identical frequency band. The oscillators 744 to 746 generate the fixed frequency signals which are different from each other, and the band-pass filter are used to take the respective signals of the predetermined frequencies. Each signal which passed through the band-pass filter is inputted to one of the demodulators 750 to 752, then demodulated. Finally, a signal, generated after addition of the filtered signals at a sound signal adding circuit 753, is outputted.

In other words, in case of a sound signal, the variable frequency oscillator 712 (see FIG. 9) of a terminal modulates the sound signal in the deviation of 20 kHz around 10 MHz. Assume that the frequency of the fixed frequency oscillator 714 (FIG. 9) is 9.1 MHz, the band-pass filter connected down-stream passes and outputs a signal having the frequency of 0.9 MHz out of inputted two signals having frequencies of 19.1 MHz and 0.9 MHz, respectively. Therefore, in the sound signal demodulating circuit 440 of the optical signal transmitting/receiving unit 515, among signals which are generated by the fixed frequency oscillators 744 to 746, the output signal having the frequency of 10 MHz which is multiplied by a signal of the frequency 9.1 MHz at one of the multipliers 741 to 743 passes through corresponding of the band-pass filters 747 to 749. Finally, the passed signal is sent to be demodulated in the corresponding demodulating circuit down-stream.

As explained above, the sound signal demodulating circuit 440 corresponds to the case where each terminal outputs a signal having a different frequency each other, thus each number of multipliers and oscillators is the same as the number of the terminals. Therefore, if an optical signal having a different frequency is outputted from each of the terminals, the modulated signal is inputted to the demodulator down-stream after passing one of a plurality of band-pass filters, then the modulated sound signal is demodulated by the demodulator and changed to the sound signal. After being processed, the sound signal is outputted to the sound signal output circuit 460 through the sound adding circuit 753.

Figure 14:
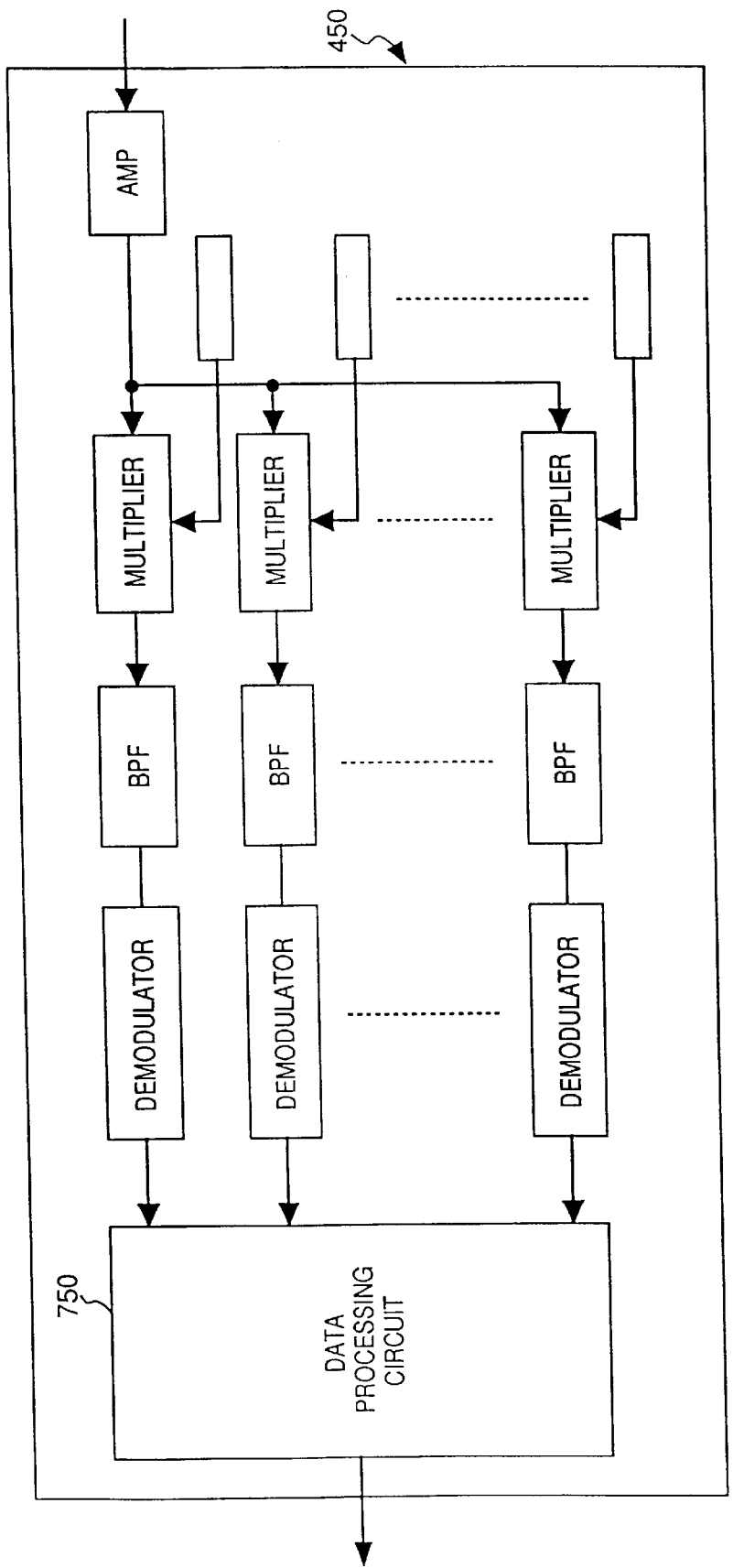
FIG. 14 is a block diagram showing a structure of a data signal demodulating circuit of the optical signal receiving unit of the central device according to the embodiment.

FIG. 14 is a block diagram illustrating a structure of the data signal demodulating circuit 450. The basic structure of the circuit 450 is similar to the structure of the sound signal demodulating circuit 440 in FIG. 13. In the data signal demodulating circuit, as in the sound signal demodulating circuit, each number of multipliers and oscillators is the same as the number of the terminals, and the signals which passed the band-pass filter are demodulated by the demodulator down-stream and outputted to the inter-face circuit 470 through the data processing circuit 750.

Next, an operation of the conference system will be explained with reference to the aforementioned structure.

First, when the power of the TV conference system central device 506 is turned on, a video signal to be displayed on the projector 521 is outputted from the central device 506 through the output terminal 611, and displayed on the projector 521 as well as inputted to the video signal input terminal 310 of the optical signal transmitting/receiving circuit 515. The input video signal is modulated by the video signal modulating circuit 320, and sent through the signal multiplex circuit 350 to the LED driver 360, and amplified there. The LED 370 is driven by the LED driver 360 which changes the modulated video signal to an optical signal, and send it to the optical signal receiving unit 200 of a terminal of a conference attendant. The transmitted optical signal is detected and received by the photo-diode 210 of the optical signal receiving unit 200 in the terminal, and further sent to the signal separating circuit 230 after amplified by the signal detecting circuit 220. Then the detected signal is separated into the video signal, data signal, and the sound signal by the signal separating circuit 230. The video signal, out of these signals, is sent to the video signal demodulating circuit 240 and demodulated there, further outputted to the liquid crystal driver 270. Accordingly, the liquid crystal drier 270 outputs the video signal to the liquid crystal display unit 201, and it displays the image.

A conference attendant can watch the displayed image on the liquid crystal display unit 201 of its terminal, and in a case where he or she wants to designate other party of the conference system, he or she connects to the other conference room by displaying a list of the other parties and pointing the desired party on the list with the pen 544. In this case, the position information designated by the conference attendant using the digitizer 101 is inputted to the data input terminal 110 of the transmitting unit 100 of the terminal. After the position information is modulated by the data signal modulating circuit 120, sent to the LED driver 150 through the signal multiplex circuit 140. The LED driver 150 amplifies the multiplexed signal and drives the LED 160 to change to an optical signal. Afterwards, the modulated and multiplexed signal including position information is sent to the receiving unit 400 of the TV conference system central device 506.

In the receiving unit 400 of the TV conference system central device 506, the optical signal which is sent from the terminal is received by the photo-diode 410, then the received signal is sent to the signal detecting circuit 420 to be amplified. In the signal separating circuit 430, a data signal is separated from the amplified signal, then sent to the data signal demodulating circuit 450. Afterwards, the demodulated data signal is sent to the data signal driver 619 of the central device 506 through the inter-face circuit 470. Accordingly, the TV conference system central device 506 reads out data of the designated other party of the TV conference stored in the data memory (provided in the controller 605), based on the image information on the screen and the position information designated in the terminal with the pen 544, and visualizes the data as well as outputs to the projector 521 and the video input terminal 310 of the transmitting unit 300.

The video signal outputted to the video input terminal 310 is displayed on the liquid crystal display unit 201 of each terminal through the same route which is mentioned above. Accordingly, the conference attendant designates the other party to be connected on the liquid crystal display unit 201 with the pen 544. The position information designated on the digitizer 101 with the pen 544 is sent through the same route as explained above to the TV conference system central device 506. Thus the TV conference system central device 506 connects the line to the designated party of the TV conference system. As the line is connected, a sound from the other system is transmitted to the input terminal 311 of the optical signal transmitting and receiving circuit 515 through the codec 601 and the sound signal output circuit 622 of the TV conference system central device 506, then sent to the signal multiplex circuit 350 through the sound signal modulating circuit 330. In the signal multiplex circuit 350, the image signal sent from the central device 506 to the projector 521 and the modulated sound signal are frequency multiplexed, and outputted to the LED driver 360. The LED driver 360 amplifies the multiplexed signal to turn on the LED 370. Accordingly, the LED 370 change the frequency multiplexed signal to the optical signal to output.

The optical signal which is modulated in the aforementioned manner is sent to the photo-diode 210 of the receiving unit 200 of the terminal, then detected by the signal detecting circuit 220 and amplified. The video signal and the sound signal which are separated by the signal separating circuit 230 is sent to the video signal demodulating circuit 240 and a sound signal demodulating circuit 250, respectively, to be demodulated. Thus the demodulated video signal is sent to the liquid crystal driver 270, and displayed on the liquid crystal display unit 201. Regarding the demodulated sound signal, it is sent to the speaker/ear-phone driver 280 and changed to the sound signal at the head-phone 202.

It should be noted that the digitizer 101 is explained as to be fixedly set at each terminal in this embodiment. However, the invention is not limited by this embodiment, and a plurality of digitizers can provide the TV conference system of the invention without connecting the digitizers to the terminals or the central device 506 by cables, by means that each digitizer transmits an optical signal having the different frequency from each other to the terminals or the central device.

According to the aforementioned embodiment, the central device 506 and the terminals can transmit and receive a sound data, an image data, and the like without a cable. Thus, with the use of this invention applied to the TV conference system, the layout of the central device and the terminals is easily rearranged without considering the length or the connections of cables when the change of layout is necessary because of the change of a number of conference attendants.

The present invention is not limited to the above embodiments and various changes and modification s can be made within the spirit and scope of the present invention. Therefore, to apprise the public of the scope of the invention, the following claims are made.

What is claimed is:

1. A device for directly irradiating a first apparatus with an optical signal and receiving an optical signal from the first apparatus and communicating information with the first apparatus, said first apparatus being connected to a second apparatus via a communication line, the device receiving means for directly receiving the optical signal including video data from the first apparatus, said video data is captured by a video camera connected to the first apparatus or the second apparatus;

display means, having a display unit, for displaying an image based on the video data received by said receiving means;

input means for inputting a data signal related to the image displayed on the display unit and for causing said display means to update an image displayed on the display unit in accordance with the data signal, and irradiation means for generating the optical signal based on the data signal inputted by said input means and for irradiating the first apparatus with the optical signal.

2. A device according to claim 1, wherein said input means comprises sound input means for inputting a sound signal and modulating the sound signal.

3. A device according to claim 1, wherein said input means has a digitizer having a position sensing plate provided on the display unit, said input means generates the data signal based on a position information designated on said digitizer.

4. A device according to claim 1, further comprising: data modulating means for modulating the data signal inputted by said input means.

5. A device according to claim 2, further comprising: modulating means for modulating the data signal inputted by said input means; and multiplex means for frequency multiplexing modulated data signal-from said modulating means and modulated sound signal from said sound input means.

6. A device according to claim 1, wherein said receiving means receives a frequency multiplexed optical signal emitted from the first apparatus; said receiving means comprising:

signal separating means for separating the frequency multiplexed optical signal received by said receiving means into signals, each of which has a different frequency band; and demodulating means for demodulating each of the signals separated by said signal separating means and for converting at least one of the signals into the video data.

7. A device according to claim 6, wherein the frequency multiplexed optical signal at least includes a video signal component, said signal separating means separates the video signal component from the frequency multiplexed optical signal, and said demodulating means converts the video signal component to the video data.

8. A device according to claim 6, wherein the frequency multiplexed optical signal at least includes a sound signal compound, said signal separating means separates the sound signal component from the frequency multiplexed optical signal, and said demodulating means converts the sound signal component to a sound signal.

9. A device according to claim 8, further comprising an electrical-sound transducer means for outputting sound based on the sound signal.

10. A device for directly for directly irradiating a first apparatus with an optical signal and receiving an optical signal from the first apparatus said first apparatus being connected with the first apparatus, said first apparatus being connected to a second apparatus via a communication line, the device comprising:

receiving means for receiving the optical signal including video data from the first apparatus, said video data is captured by a video camera connected to the first apparatus or the second apparatus;

demodulating means for demodulating the optical signal and generating the video data;

display means, having a display unit, for displaying an image based on the video data received by said receiving means;

input means for inputting a data signal related to the image displayed on the display unit and for causing said display means to update an image displayed on the display unit in accordance with the data signal, and irradiation means for generating the optical signal based on the data signal inputted by said input means and for irradiating the first apparatus with the optical signal.

11. A device according to claim 10, further comprising: sound input means for inputting a sound signal and converting the sound signal into an electrical signal; and modulating means for modulating the electrical signal generated by said sound input means, wherein said irradiation means generates the optical signal based on modulated signal modulated by said modulating means.

12. A device according to claim 10, further comprising: sound input means for inputting a sound signal and converting the sound signal into an electrical signal;

modulating means for modulating the electrical signal generated by said sound input means and the data signal inputted by said input means; and multiplex means for frequency multiplexing modulated signal modulated by said modulating means, wherein said irradiation means generates the optical signal based on a frequency multiplexed signal from said multiplex means.

13. A device according to claim 10, wherein said data input means includes digitizer having a position sensing plate provided on the display unit, said data input means generates the data signal in dependence upon a position information designated on said digitizer.

14. A device according to claim 10, wherein said receiving means receives a frequency multiplexed optical signal, the device further comprising:

signal separating means for separating a video signal component from the frequency multiplexed optical signal, wherein said demodulating means converts the video signal component into the video data.

15. A device according to claim 10, wherein said receiving means receives a frequency multiplexed optical signal, the device further comprising:

signal separating means for separating a sound signal component from the frequency multiplexed optical signal, wherein said demodulating means converts the sound signal component into a sound signal.

16. A conference system comprises a plurality of devices for conference attendants and each of the plurality of devices being able to directly irradiate a first apparatus with an optical signal and receive an optical signal from the first apparatus and communicate information with the first apparatus, each of the devices comprising:

receiving means for receiving the optical signal including video data from the first apparatus, said video data is captured by a video camera connected to the first apparatus or the second apparatus;

display means, having a display unit, for displaying an image based on the video data received by said receiving means;

input means for inputting a data signal related to the image displayed on the display unit and for causing said display means to update an image displayed on the display unit in accordance with the data signal, and irradiation means for generating the optical signal based on the data signal inputted by said input means and for irradiating the first apparatus with the optical signal, and the first apparatus comprising:

video camera being connected to the first apparatus and for capturing the video data;

optical signal receiving means, having the optical signal receiving unit, for receiving a plurality of optical signals from said irradiation means of the devices;

multiplex means for generating a frequency multiplexed signal from the plurality of optical signals from the plurality of devices; and light emitting means for converting the frequency multiplexed signal from said multiplex means into an optical signal and emitting the optical signal to directly irradiate to the receiving means of the plurality of devices.

17. A conference system according to claim 16, wherein the first apparatus comprises a display unit, the display unit displays an image from the video camera and information based on the data signal inputted by said input means of the devices.

18. A conference-system according to claim 16, wherein the device further comprises:

sound input means for inputting a sound signal; and multiplex means for frequency multiplexing the sound signal and the data signal;

wherein said irradiation means generates the optical signal based on a frequency multiplexed signal multiplexed by said multiplex means and irradiates the first apparatus with the optical signal.

19. A conference system according to claim 16, wherein the device further comprises modulation means for modulating the data signal, said irradiation means generates an optical signal based on a modulated data signal modulated by said modulation means and irradiates the first apparatus with the optical signal, the first apparatus further comprising:

demodulation means for demodulating the optical signal received by said optical signal receiving means and generating a data signal corresponding to the optical signal.

20. A conference system according to claim 16, wherein said input means having:

a digitizer provided on the display unit, having a transparent position sensing plate, and for generating a position data signal in dependence upon position designated on said position sensing plate, wherein said irradiation means generates an optical signal based on the position data signal inputted from said digitizer:

said first apparatus further comprises:

image signal generating means for generating an image signal in dependence upon the position data signal; and display means for displaying an image based on the image signal generated by said image signal generating means.

21. A device for directly irradiating a first apparatus with an optical signal and receiving an optical signal from the first apparatus and communicating information with the first apparatus, said first apparatus being connected to a second apparatus via a communication line, the device comprising:

receiving means for directly receiving the optical signal including video data from the first apparatus, said video data is captured by a video camera connected to the first apparatus or the second apparatus;

display means, having a display unit, for displaying an image based on the video data received by said receiving means:

image input means for inputting an image signal related to the image displayed on the display unit and for causing said display means to update an image displayed on the display unit in accordance with the image signal, and converting the image signal to an electrical signal;

data input means for inputting data and generating a data signal;

first modulating means for modulating said electrical signal outputted from said image input means;

second modulating means for modulating said data signal generated by said data input means;

multiplex means for frequency multiplexing modulated signals from said first and second modulating means;

irradiation means for generating an optical signal based upon a frequency multiplexed signal from said multiplex means and for irradiating the first apparatus with the optical signal.

22. A device according to claim 21, wherein said data input means and said image input means comprises:

a digitizer having a position sensing plate provided on said display unit, said image input means inputs the image signal based on a position information designated on said digitizer.

23. A device according to claim 21, further comprising:

sound input means for inputting a sound signal and converting the sound signal to an electric signal, and third modulating means for modulating said electrical signal output from said sound input means, wherein said multiplex means further frequency multiplexes a modulated signal from said third modulating means.

24. A conference system comprises a plurality of devices for conference attendants and a central apparatus, said central apparatus comprising:

video input means for inputting a video signal;

data receiving means for receiving a data signal from the plurality of devices; and image output means for outputting the video signal and an image signal made from the data signal received by said data receiving means to the plurality of devices;

each of the devices comprising:

receiving means for receiving the video and image signal from the central apparatus, display means having a display unit, for displaying an image based on the video and image signal received by said receiving means;

input means for inputting the data signal related to the image displayed on the display unit and for causing said display means to update an image displayed on the display unit in accordance with the data signal; and output means for outputting the data signal inputted by said input means to the central apparatus.

25. A conference system according to claim 24, wherein said input means includes a digitizer having a position sensing plate provided on the display unit, said input means generates the data signal in dependence upon a position information designated on said digitizer.

26. A conference system according to claim 24, wherein each of said video input means and said receiving means has an optical signal reception unit for directly receiving an optical signal, and each of said image output means and said output means has an optical signal output unit for irradiating the optical signal reception unit.

27. A central apparatus used in a conference system including a plurality of devices for conference attendants, comprising:

video input means for inputting a video signal;

data receiving means for receiving a data signal from the plurality of devices; and image output means for outputting the video signal and an image signal made from the data signal received by said data receiving means to the plurality of devices.

28. A device provided for a conference attendant in the conference system including a central apparatus for receiving a data signal from a plurality of devices and for outputting a video signal and an image signal made from the data signal to the plurality of devices, comprising:

receiving means for receiving the video and image signal from the central apparatus;

display means having a display unit, for displaying an image based on the video and image signal received by said receiving means;

input means for inputting a data signal related to the image displayed on the display unit and for causing said display means to update an image displayed on the display unit in accordance with the data signal; and output means for outputting the data signal inputted by said input means to the central apparatus.

\* \* \* \* \*

UNITED STATES PATENT AND TRADEMARK OFFICE
CERTIFICATE OF CORRECTION

PATENT NO. : 5,818,616

DATED : October 6, 1998

INVENTOR(S) : Hisashi Kawai

It is certified that error appears in the above-identified patent and that said Letters Patent is hereby corrected as shown below:

Col. 3, line 13, after "which" insert --an--.
Col. 3, line 20, after "in" delete "the".
Col. 3, line 34, after "in" delete "the".
Col. 4, line 18, delete "builtin" and insert --built-in--.
Col. 4, line 48, after "616" delete "do" and insert --does--.
Col. 5, line 25, after "from" delete "other" and insert --another--.
Col. 5, line 52, after "625," insert --and--.
Col. 6, line 14, after "In" insert --the--.
Col. 6, line 17, after "in" insert --the--.
Col. 7, line 47, after "any" insert --of the--.
Col. 9, line 57, delete "output" and insert --outputs--.
Col. 9, line 66, after "736," insert --it is--.
Col. 9, line 66, after "737," insert --and--.
Col. 10, line 7, delete "output" and insert --outputs--.
Col. 10, line 42, delete "filter" and insert --filters--.
Col. 10, line 48, after "in" insert --the--.
Col. 10, line 67, after "frequency" insert --from--.
Col. 11, line 17, after "of" delete "the".
Col. 11, line 34, delete "send" and insert --sends--.
Col. 11, line 43, after "there," insert --and--.
Col. 11, line 44, delete "drier" and insert --driver--.
Col. 11, line 49, delete "other" and insert --another--.
Col. 11, line 57, before "sent" insert --it is--.
Col. 11, line 60 after "change" insert --the signal--.
Col. 12, line 2, before "then" insert --and--.
Col. 12, line 27, before "then" insert --and--.
Col. 12, line 34, delete "change" and insert --changes--.

UNITED STATES PATENT AND TRADEMARK OFFICE
CERTIFICATE OF CORRECTION

PATENT NO. : 5,818,616

DATED : October 6, 1998

INVENTOR(S) : Hisashi Kawai

It is certified that error appears in the above-identified patent and that said Letters Patent is hereby corrected as shown below:

Col. 12, line 38, before "then" insert --and--.
Col. 12, line 41, before "sent" delete "is" and insert --and--.

Signed and Sealed this

Twenty-fourth Day of August, 1999

Attest:

Q. TODD DICKINSON

*Attesting Officer*  *Acting Commissioner of Patents and Trademarks*